United States Patent
Ledeganck (10) Patent No.: US 11,460,014 B2
(45) Date of Patent: Oct. 4, 2022

(54) METHOD TO SET-UP A VOLUMETRIC DOSAGE PUMP IN OPERATING POSITION

(71) Applicant: Neoceram S.A., Srépy-Bracquenies (BE)

(72) Inventor: Robin Ledeganck, Piéton (BE)

(73) Assignee: Neoceram S.A., Strepy-Bracquegnies (BE)

( * ) Notice: Subject to any disclaimer, the term of this patent is extended or adjusted under 35 U.S.C. 154(b) by 105 days.

(21) Appl. No.: 16/256,293

(22) Filed: Jan. 24, 2019

(65) Prior Publication Data
US 2019/0257296 A1    Aug. 22, 2019

(51) Int. Cl.
*F04B 13/00*    (2006.01)
*F04B 39/12*    (2006.01)
*F04B 53/16*    (2006.01)
*F04B 53/22*    (2006.01)

(52) U.S. Cl.
CPC ............ *F04B 13/00* (2013.01); *F04B 39/125* (2013.01); *F04B 53/16* (2013.01); *F04B 53/22* (2013.01)

(58) Field of Classification Search
CPC .......... F04B 13/00; F04B 53/16; F04B 53/22; F04B 39/125; F16B 2/00–26; F16B 21/06–07
See application file for complete search history.

(56) References Cited

U.S. PATENT DOCUMENTS

| | | | | |
|---|---|---|---|---|
| 3,480,310 A | * | 11/1969 | McElwain | F16D 3/387 403/322.2 |
| 6,739,478 B2 | * | 5/2004 | Bach | B01L 3/0206 222/1 |
| 7,004,843 B1 | * | 2/2006 | Kerstetter | F16D 3/18 464/149 |
| 2006/0292016 A1 | | 12/2006 | Hitter et al. | |

FOREIGN PATENT DOCUMENTS

| | | | | |
|---|---|---|---|---|
| CN | 203081672 U | * | 7/2013 | |
| EP | 3045724 A1 | | 7/2016 | |
| FR | 2823543 A1 | * | 10/2002 | .......... F16C 11/0647 |
| WO | WO-2004072592 A1 | * | 8/2004 | ............ G01F 15/18 |

* cited by examiner

*Primary Examiner* — Kenneth J Hansen
*Assistant Examiner* — Thomas Fink
(74) *Attorney, Agent, or Firm* — Leydig, Voit & Mayer, LTD (57) ABSTRACT

The invention relates to the installation of volumetric pumps to mechanical means inside controlled areas with limited operator access. In particular, the invention relates to a method for setting up in an operating position such a pump arranged for filling up containers, the pump comprising a body with piston means slidingly mounted therein and switching means rotatably mounted within the body, the piston and switching means extending outside the body, said method comprising holding the piston and switching means together with the body of the pump, hooking up either one of the body and the piston and the switching means to a pivot (P), and rotating the pump around the pivot (P) to fasten the (Continued)

other one of the body and the piston and the switching means on an operating support.

16 Claims, 5 Drawing Sheets

METHOD TO SET-UP A VOLUMETRIC DOSAGE PUMP IN OPERATING POSITION

CROSS-REFERENCE TO RELATED APPLICATIONS

The present Application for Patent claims priority to European Patent Application No. EP18158048.1 by Ledeganck entitled "Method To Set-Up A Volumetric Dosage Pump In Operating Position," filed Feb. 22, 2018, incorporated by reference herein in its entirety.

BACKGROUND

The invention relates to the field of volumetric pumps and in particular the installation of such pumps to the mechanical means inside controlled areas with limited operator access.

Industries like the food industry of the pharmaceutical industry use volumetric pumps, or positive displacement pumps, to fill individual containers with liquid preparations, like for example pharmaceutical preparations into syringes (vaccines), solutions into pouches for intravenous administrations, pasteurized juices into bottles, etc. . . . . It is of utmost importance that the liquid preparations remain pure and sterile and that the volume dispensed is very precise.

To reach these objectives, high precision volumetric pumps have been developed, in various materials, like stainless steel or even ceramics, in order to avoid any metal contamination.

These pumps are usually built around a main central axis defined by a cylinder, hollowed out in a casing, in which a piston is slidingly longitudinally moveable, with a predefined amplitude to define a metering chamber having a determined volume. In some cases, referred to as two-element pumps, a channel is arranged in the piston which additionally rotates around the axis to alternatively connect the metering chamber with the inlet and the outlet nozzles of the pump, said channel therefore serving as a switching valve. In other cases, referred to as three-element pumps, the switching valve is built in a separate element, also inserted in the cylinder. In this later case, the piston is actioned via a sliding element while the switching valve is actioned with a separate rotating element. The person skilled in the art is familiar with these pumps and EP3045724 discloses how such pumps work.

Volumetric pumps need to be regularly cleaned, for example when starting a new lot production, to avoid cross contaminations.

One difficulty encountered with such volumetric pumps is their assembly to the machine which will maintain and activate the various elements of the pumps, these elements being loose from each other.

Indeed, the assembly of the pump to the available equipment requires:
screwing a nut to hold the extremity of the piston to an interfacing element and then pinning the interfacing element to the sliding arm of the machine, the whole arrangement thereby ensuring precise longitudinal displacement of the piston while enabling some lateral flexibility to prevent any damage to the piston;
fixing the core cylinder of the pump to a immobile element of the machine to ensure stability of the central cylinder, and securing the switching valve to the rotating arm of the machine by screwing an interfacing element to the pump element and pinning it to the machine.

In particular, when working in a sterile environment, like a glove box, it is a very delicate operation for an operator wearing thick gloves to hold the various parts of the pumps while performing all the steps of screwing and inserting pins. There is both a risk of damaging the pump during the installation and the risk that some sharp elements damage the gloves, thereby breaking the sterility conditions with the risk of releasing contaminating particles on the pump.

Devices for gripping a pump during its installation are disclosed in WO2004072592. Though these devices enable to secure together the parts of the pump during its installation, the operator using it still needs to fasten nuts (73) and screws (72) and to be very careful to insert the pump with an horizontal movement.

The applicant therefore judges necessary to propose a new method to safely and quickly fix volumetric pumps to the corresponding machinery.

SUMMARY

To this purpose, it is proposed a method for setting up in an operating position a volumetric dosage pump arranged for filling up containers, the pump comprising a body with piston means slidingly mounted therein and switching means rotatably mounted within the body, the piston means and the switching means extending outside the body, said method comprising the following steps:
one holds the piston means and the switching means fast together with the body of the pump,
one hooks up either one of the body, the piston means and the switching means to a pivot, and
one rotates the pump around the pivot to fasten the others of the body (3; 93), the piston means and the switching means on an operating support.

For a two-element pump, the pump comprises a piston, including a switching valve or channel, slidingly and rotatably mounted within the body.

For a three-element pump, is the pump comprises a piston and a switching valve, the piston and the switching valve extending outside the body (3) and wherein
one hooks up either one of the body, the piston and the switching valve to a pivot, and
one rotates the pump around the pivot to fasten the two others of the body, piston and the switching valve on the operating support.

By hooking up and fastening, it is here referred to a simple connection wherein the two parts are connected to each other by a shape cooperation, i.e. without any additional element like screws, bolts, pins, nuts or any element requiring a manual intervention for their assembly. Terms like interlocking or self-interlocking will also be used to describe this connection by shape cooperation.

Hooking and fastening can be reached by various means and designs of the elements like, for example, clipping, snapping, magnetically attaching, or by means of adhesive strips.

Therefore, the method of the invention simply requires associating a first part of the pump to an allocated position on the machine, this connection point further serving as pivot for a rotating movement to connect to the other fastening means on the pump to their allocated positions on the machine, hereby referred to as operating support. This could be summarized as a multiple click operation.

The operating support refers to the static part and/or to mobile parts of a machine, which can be used, upon connection with parts of the pump, to prevent a part of the pump from moving during pumping operations and/or to apply a sliding or rotating movement to another part of the pump.

The operator coupling the pump to the machine does not need any fastening component. The operation is performed very fast and without any risk that a glove is torn or that a small piece falls.

In some cases, one hooks up the piston to the pivot and the pump is rotated for fastening the switching valve to a rotating part. In other cases, one hooks up the switching valve to the pivot and the pump is rotated for fastening the piston to a sliding part. In still other cases, one hooks up the body and the pump is rotated for fastening the piston to a sliding part and the switching valve to a rotating part.

Preferably, the piston means is slidingly mounted along a pump axis (AA') and the switching means is rotatably mounted around said pump axis and, upon rotation of the pump, the pump axis (AA') moves within a vertical plane.

Setting up of the pump in operating position comprises setting up the volumetric dosage pump on a driving machine having a static body and a first arm for driving a sliding movement of the piston, said arm being aligned along a machine axis (BB').

For a two-element pump, the first arm also drives a rotating movement of the piston comprising the switching means. For a three-element pump, the machine comprises a second arm for driving a rotational movement of the switching valve, said first and second arms being aligned along a machine axis (BB').

So, according to the method of the invention, at the end of the rotation, the pump axis (AA') overlaps the machine axis (BB').

To apply the method of the invention, it is also proposed an assembly of a volumetric dosage pump arranged for filling up containers comprising a body with piston means slidingly mounted therein and switching means rotatably mounted within the body, the piston means and the switching means extending outside the body, and a driving machine comprising a static body and a first arm for driving a sliding movement along a machine axis characterized in that the piston means and the body of the pump are arranged to be fastened to the first arm and the static body respectively, by shape cooperation exclusively.

For a two-element pump, the piston comprises a switching valve and the first arm is also for driving a rotational movement around the machine axis. The body is then arranged to be fastened to the static body.

For three-element pumps, the pump comprises a piston and a switching valve extending outside the body, and the driving machine further comprises a second arm for driving a rotational movement around the machine axis, the switching valve being arranged to be fastened to the second arm by shape cooperation exclusively.

The cooperation of shape proceeds through self-interlocking means arranged to connect two by two the piston and the first arm, the body of the pump and on the static body, and, when present, the switching valve and the second arm of the machine.

Preferably, the cooperating interlocking means are made from solid/rigid materials having some degree of flexibility, like for example thermoplastic materials, as the ones used in medical devices. This enables a reliable and secure connection while allowing some degree of flexibility. This flexibility can indeed be required to avoid damage to the pump in the case of a small deviation of the axis of a machine arm.

A an intermediate product, the invention also relates to a volumetric dosage pump arranged for filling up containers comprising a body with a piston slidingly mounted therein and a switching valve rotatably mounted within the body, the piston and switching valve extending outside the body, characterized in that one of the body, the piston and the switching valve is provided with hooking means and the two others with fastening means.

The method, the assembly and the dosage pump of the invention are clearly linked by a unique common inventive concept. The characteristics of the assembly and the pump enabling to realize the method of the invention.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The invention will be better understood with the following description of several examples, referring to the accompanying drawing on which.

DETAILED DESCRIPTION

Figure 1:
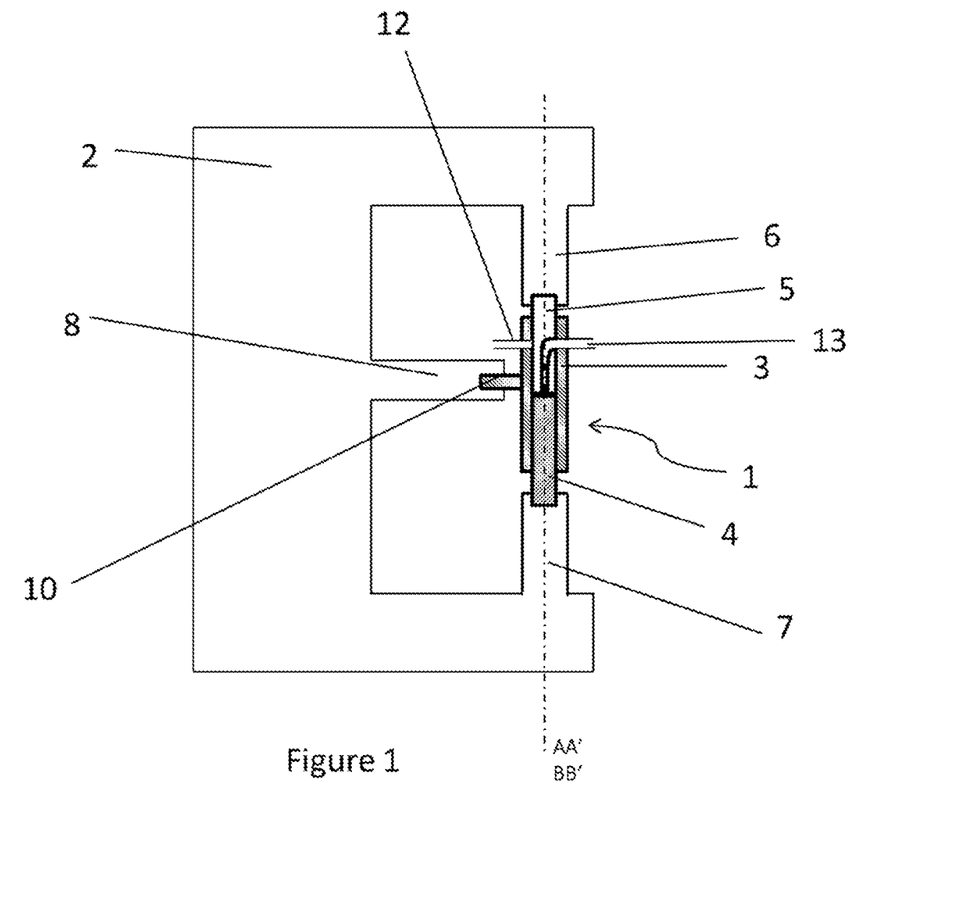
FIG. 1 is a sectional scheme of the assembly of the invention.

FIG. 1 illustrates schematically the principle of the interconnections of a machine 2 with a pump 1, in its operating position. The machine 2 comprises two arms 6 and 7, as well as a static part 8. The pump 1 comprises a hollow cylindrical body 3, inside which a piston 4 is slidingly mounted along an axis AA' and a switching valve 5 is rotatably mounted around the axis AA', a fluid inlet 12 and a fluid outlet 13. The piston and the switching valve have a general cylindrical shape matching the inside of the body 3. The piston 4 and the switching valve 5 are protruding each from one side of the body 3. A spigot 10 protrudes from a lateral side of the body 3.

Figure 2:
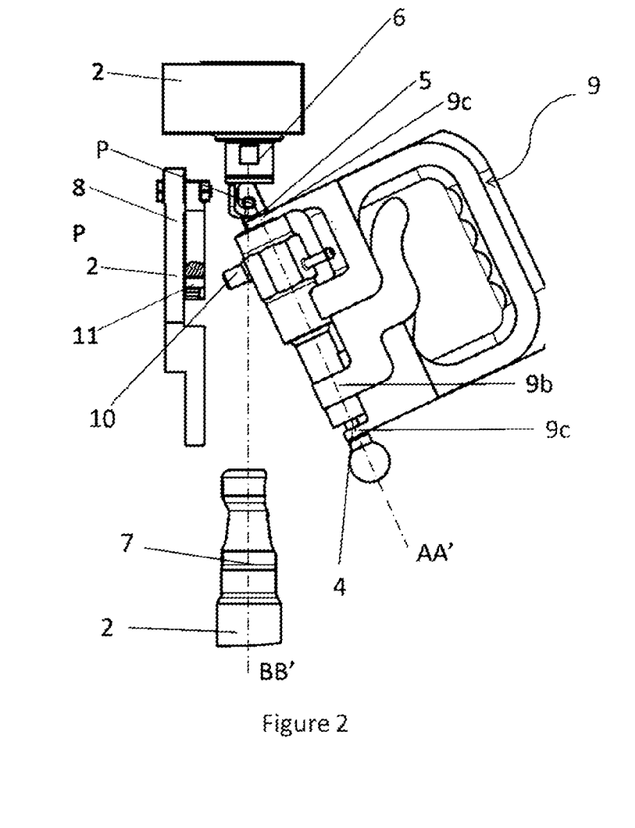
FIG. 2 illustrates a configuration of the pump during its set-up.
Figure 3:
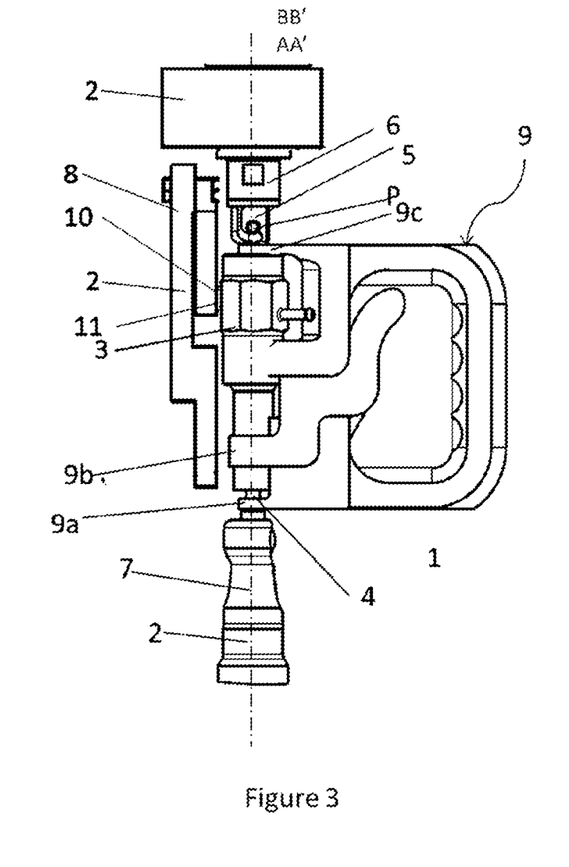
FIG. 3 illustrates another configuration of the pump when implementing the method of the invention.

Referring to FIGS. 2 and 3, the method of the invention enables to set-up the volumetric dosage pump 1 to the driving machine 2, only partially represented here for clarity purpose.

The driving machine 2 comprises two opposite corresponding arms 6 and 7. The arm 6 is here driving a rotational movement around the axis BB' and the arm 7 is here driving a translational movement along the axis BB'. The machine further comprises a static part 8 wherein is arranged a receiving clip element 11.

In a first step, the piston 4 and the switching valve 5 are first assembled and held together in the body 3 of the pump. This is here enabled by a handle 9 which releasably holds the body 3 at position 9b, the piston at position 9a and the switching valve 5 at position 9c. The handle 9 therefore holds together the loose parts of the pump, which can then be manipulated, with one hand, without any risk of falling apart. The handle can also ensure that the distance between the extremities of the pump matches the distance between the extremities of the arms of the machine, thereby facilitating the coupling of the pump onto the machine.

The handle can have any suitable characteristics to enable an operator to open and close the jaws of the handle onto each parts of the pump with only one hand. It can for example function as a clothes pin or via a push button triggering the opening of the jaws.

The use of a handle is however not compulsory. An operator can very well hold the parts of the pump in one of his hands. Alternatively, he can hold the bottom part of the pump, here the piston 4; the remaining parts 3 and 5 are then maintained assembled together by gravity force.

In the second step (FIG. 2), the extremity of the switching valve 5 is hooked-up, i.e. connected, to the extremity of the arm 6 of the machine, the connection forming a pivot P around which the pump, and thereby the pump axis AA', can rotate. The technical features of the connecting or interlocking means will be described in details below, but it is to be noted that no external element needs to be used. No screw, pin or bolt is necessary, as in existing systems.

In the last step, the pump is rotated around the pivot P until axis AA' overlaps axis BB' as illustrated on FIG. 2. Upon reaching the overlap, the extremity of the piston 4 is fastened to the extremity of the arm 7 at virtually the same time as the spigot 10 is fastened to the receiving element 11 on the static part 8 of the machine.

As a result, the pump is connected to the machine at three connecting or interlocking points: the extremity of the mobile parts, i.e. the piston and the switching valve, are connected to the driving arms 6 and 7 of the machine and the body 3 of the pump 1 is fixed to the static body 8 of the machine 2.

The operator can then release the pump by either releasing its grip on the pump of by activating the releasing means of the handle if a handle is used.

In this particular example, the switching valve is first connected to the machine to form the pivot P. However, it is just as well possible to first connect the piston to form a pivot P'; the switching valve and the body of the pump would then be fastened by rotating the pump around the pivot P', according to the method of the invention. The choice of the first connection point may depend on the configuration of the various parts to connect from the pump and the machine.

As an object of the present invention, the assembly of the volumetric dosage pump and the machine will now be described referring to FIGS. 4 to 7.

Figure 4:
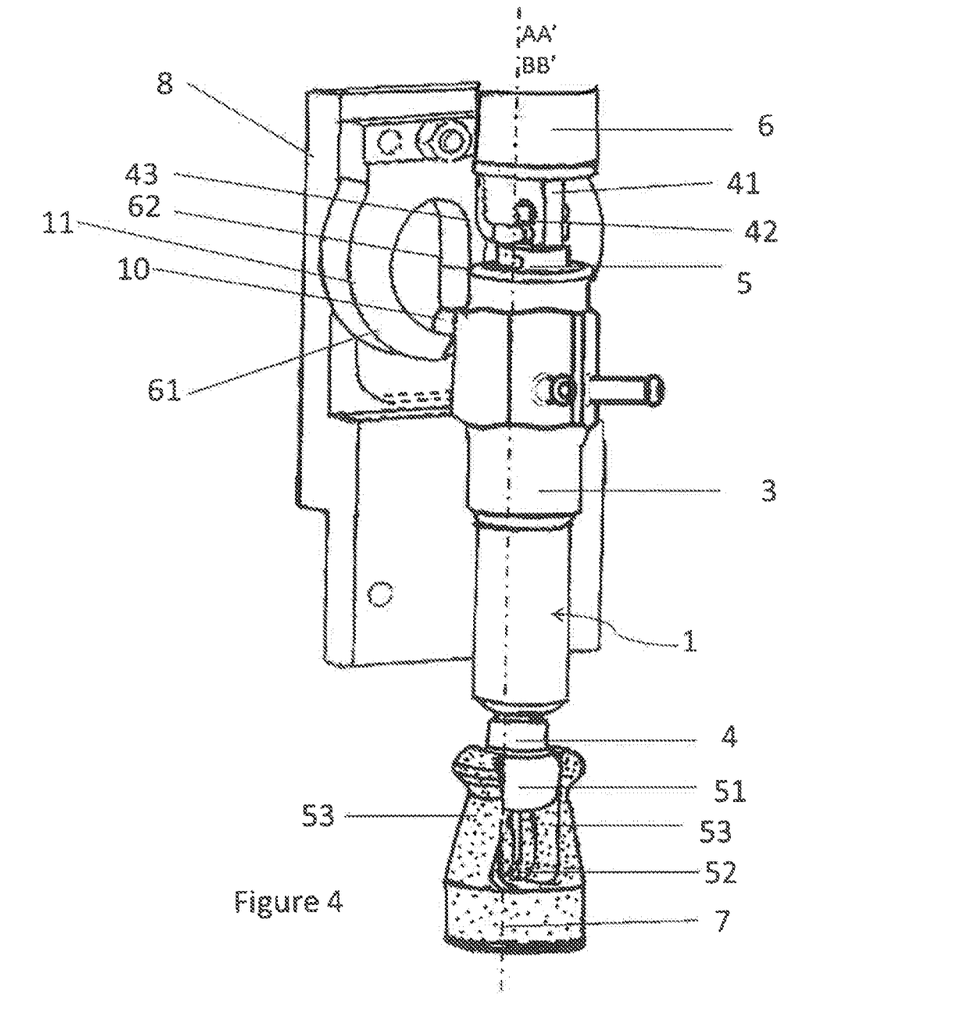
FIG. 4 illustrates the assembly of the pump and the connection points of the machine.

Referring to FIGS. 3 and 4, the portion of the switching valve 5 inserted inside the body 3 of the pump 1 has a cylindrical shape whereas its protruding extremity is here a flat parallelepiped 41 having two opposite main faces from which lateral bars 42 are perpendicularly protruding.

Figure 5:
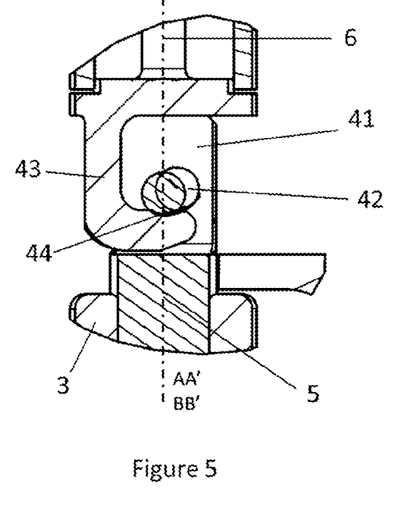
FIG. 5 is a detailed scheme of the connection of the switching valve of the pump with the arm of the machine driving a rotational movement.

The rotation driving arm 6 of the machine 2 ends with a hooked fork 43 having two teeth arranged such as to be just distant enough to receive therein between the flat parallelepiped 41 of the switching valve and such that the hooked teeth support the protruding lateral bars 42 of the switching valve in a notch or groove 44 carved on the teeth.

With such a conformation, it is very easy to interconnect the switching valve 5 with the driving arm 6 of the machine. This operation can be performed with one hand in a matter of seconds. Moreover, when the arm 6 applies a rotational movement, this movement is transferred to the parallelepiped section 41, clamped or enclosed between the teeth of the fork 43, with a high precision. The distance between the forks should of course be adjusted to the thickness of the parallelepiped 41. The lateral bars 42 being seated on these hooked teeth 43, the switching valve 5 cannot disconnect from the machine arm 6. The interlock is therefore secure, without any additional fastening means.

This cooperation of shape of the extremity of the driving arm 6 and with the switching valve additionally allows some flexibility. In cases where the axis BB' of the machine would come to slightly differ from the axis AA' of the pump, the fork would apply no stress on the switching valve, which could otherwise cause damage to the pump. This flexibility is advantageously enhanced by using flexible materials, like thermoplastics to manufacture the fork 43 and/or the extremity of the switching valve.

Once the switching valve 5 is hooked-up with the arm 6, a convenient pivot is created. Indeed, the lateral bars being advantageously cylindrical and aligned on each side of the section 41, they form an axis around which the pump 1 can be pivoted. As disclosed above regarding the method of the invention, the pump can be rotated around this pivot axis to further connect the piston 4 and the body 3 to the arm 7 and the static part 8 of the machine respectively.

The interlocking connection described above is here applied to the switching valve, receiving a rotational drive from the machine. However, a similar means could also be applied to a piston, receiving a translational drive. In that case, the teeth of the fork could be arranged to be placed below and above the lateral bars, in order to be able to transfer to the piston a translating movement in both up and down direction. It could also allow transferring both a rotating and a translating movement to the pump element thereby coupled. This could be particularly interesting for two-parts pumps, known to the person skilled in the art, where a switching valve is arranged directly within the piston, the piston then undergoing both the translation and rotational movement.

Figure 6:
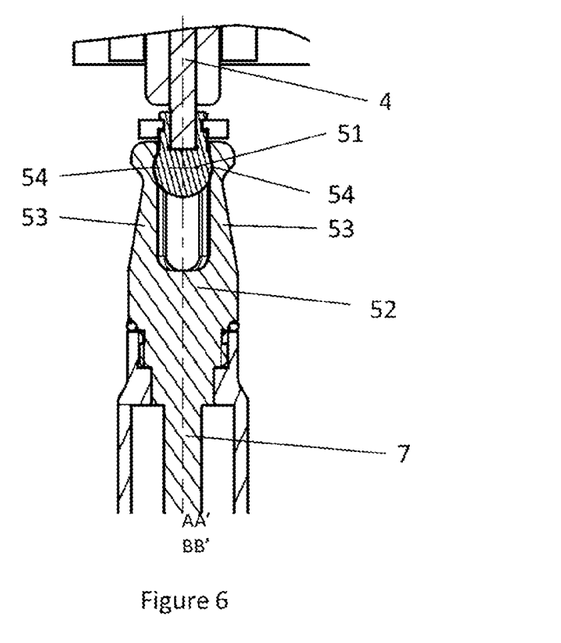
FIG. 6 is a detailed scheme of the connection of the piston with the arm of the machine driving a translational movement.

Referring now to FIGS. 4 and 6, the protruding extremity of the piston 4 has the shape of a sphere or ball 51. Complementarily, the translating arm 7 of the machine 2 ends with a clip portion 52, having here two pliers 53, each displaying, on their internal face a spherical groove 54 specifically designed to receive the ball 51. The pliers 53, though rigid, display some flexibility to allow them to slightly spread apart upon a pressure of the ball 51 in order to let the ball 51 reach the grooves 54 during interlocking. Once the ball 51 is inserted between the pliers 53, these should tend to come back to their original position, thereby applying a light holding pressure on the ball 51.

Once inserted in the clip 52, the ball 51 of the piston 4 is securely interlocked with the arm 7, which will then be able to transfer its translating movement to the piston 4 with both precision and flexibility.

The clip 52 is here described with two pliers 53, but it could of course be designed with a higher number of pliers, for example three of four pliers arranged circularly to receive the ball 51.

Alternatively, a similar connection could be designed with another shape than a ball, for example an ovoid, the grooves in the clip being complementarily designed. This would allow not only the transfer a translating movement but as well, or instead, the transfer of a rotational movement to the pump element thereby coupled. This could be particularly interesting for two-parts pumps where a switching valve is arranged directly in the piston, the piston then undergoing both a translation and rotational movement.

Additionally, once the piston 4 is interlocked with the arm 7, a convenient pivot point is created. Indeed, the ball 51 has some freedom to rotate within the grooves 54, thereby creating a pivot point. As disclosed above regarding the method of the invention, the pump could be first connected by inserting the ball 51 in the clip 52 and then be rotated around this pivot point to further connect the switching valve 5 and the body 3 to the arm 6 and the static part 8 of the machine respectively.

As explained above, following the method of the invention, one of the arms 6 or 7 of the machine is connected first. Then, by rotating the pump around a pivot point, the second arm is connected. This second connection occurs more or less simultaneously with connection of the body 3 of the pump 1 to the static part 8 of the machine 2.

Figure 7:
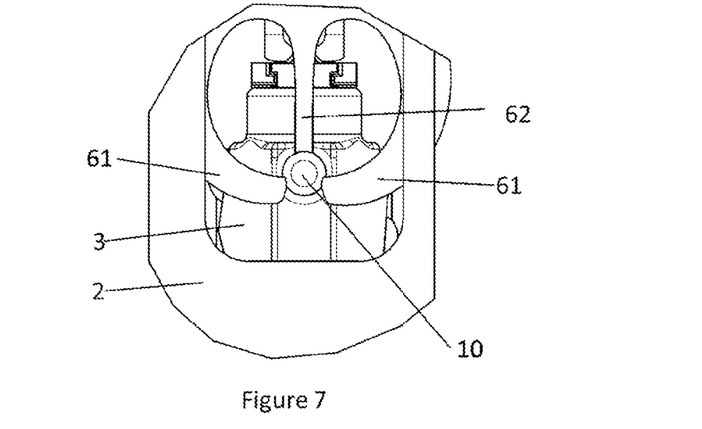
FIG. 7 is a backside view of the connection of the spigot of the pump with the static part of the machine.

Now referring to FIGS. 4 and 7, the spigot 10, here a cylindrical extension is protruding perpendicularly from the body 3 of the pump 1. When the pump 1 is fully connected with the machine 2, the spigot 10 is here horizontally positioned. The receiving element 11 on the machine 2 is here a clip comprising three teeth arranged downwardly in a same plane: the central teeth 62 extends straightforwardly downwards whereas the two lateral teeth 61 are symmetrically bent downwards such that their extremities face each other and form with the extremity of the central teeth 62 a lodging having a size slightly smaller than the section of the spigot 10.

Upon installation of the pump, the spigot 10 comes in contact with the extremities of the teeth 61, below the teeth 62 (position represented on FIG. 7). Upon a slight pressure of the spigot 10 against the teeth 61, these teeth are slightly moved apart, thereby extending the size of the lodging and letting the spigot 10 move inside the lodging, between and contacting the extremities of the three teeth (position represented on FIG. 4). This requires that the teeth are made in a rigid but flexible material, like for example a thermoplastic or thin metal blades. The spigot 10 is then enclosed in the lodging, the three teeth 61 and 62 preventing any movement of the spigot in the plane of the clip 11.

After the interlock of the three connecting points, upon working of the pump 1, the body is maintained by clip 11 at a static height, the piston is activated by the arm 7 via clip 52 and the switching valve is activated by the arm 6 via the fork 43.

Figure 8:
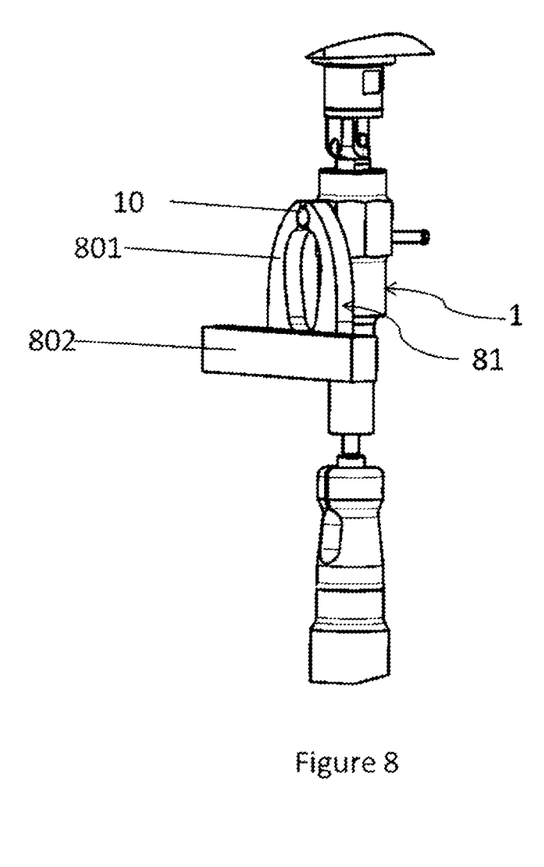
FIG. 8 is a view of another mode of connection of the spigot of the pump with the static part of the machine.

FIG. 8 illustrates an alternative clip 81 to fasten the pump 1 to a stand 802. The clip 81 has here only two teeth 801 extending upwards in a vertical plane such that their extremities face each other. The extremities are designed to enclose the spigot 10 upon a similar mechanism as described above for the clip 11. This demonstrates the wide variety of arrangements for the means to fasten the pump to the driving machine.

No external element, like screws, pins or bolts, is used to set-up the pump 1 to the machine 2. The coupling operation only takes a few seconds and could be performed with one hand.

The operation is just as easy for de-coupling the pump from the machine. The steps to be performed are:
holding the pump such that upon decoupling, the piston 4 and the valve element 5 remain assembled in the body 3;
pulling the pump to break the lock at the three connection points.

The step of pulling can be performed such as to disconnect all three interlocks at once. Alternatively, the step of pulling can consist in two steps: firstly, the first interlock of the body 3 of the pump to the static part 8 of the machine and the second interlock of one extremity of the pump, 4 or 5, to the corresponding machine arm (7 or 6) are simultaneously disconnected by applying a rotating movement to the pump around the third interlocking point serving as pivot; secondly, the third interlock is disconnected to fully release the pump. Similarly to the coupling, this step can be performed with one hand or a suitable handle, like the one disclosed on FIGS. 1 and 2 can be used.

It could even be possible that the coupling and/or de-coupling of the pump on the machine is automated and performed by a robot. For example, the handle 9 described above could be a robotized handle, which could be programmed to reach for a pump in a storage and couple the pump to the machine, or de-couple the pump from the machine and replace the pump in a storage.

The assembly of the invention therefore enables to perform the method of the invention. The method and the assembly are therefore linked by a unique inventive concept.

Though a particular arrangement of the connecting means has been illustrated, it has been shown that they could be interchanged or combined; one type of interlock could be used for more than one connection point. A person skilled in the art will realize that several other possibilities exist to design self-interlocking means, using other designs of clips and/or using magnetic coupling forces, releasable adhesives or any other suitable means. The interlocking means of the invention are not limited to the ones used here as examples.

The interlocking means illustrated here are preferably made of thermoplastic, which can for example be polytetrafluoroethylene (PTFE), PVC, polystyrene, polypropylene (PP), polyethylene (PE) or any other suitable thermoplastic known to the person skilled in the art.

However, the interlocking means may also be manufacture using other suitable materials known to a person skilled in the art. For example, some elements could be made of metal, which, depending on their shape, may show some flexibility. Some elements like, for example, the ball 51, do not need to be flexible, and could therefore be made, for example, from stainless steel or ceramics.

The method and the assembly of the present invention can apply to any size and type of volumetric dosage pumps, be it in stainless steel, in ceramics or in any other materials.

The method of the assembly also applies to setting up two-elements pumps, i.e. pumps where the piston and the switch valve are means comprised in the same element.

Figure 9:
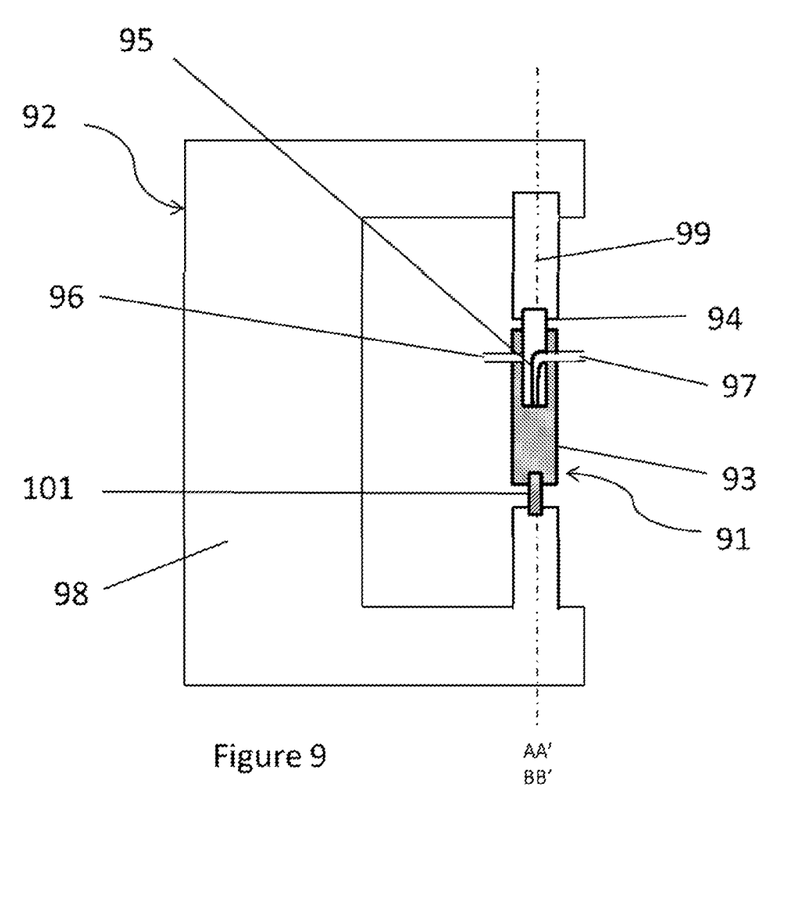
FIG. 9 is a sectional scheme of another assembly of the invention.

With reference to FIG. 9, a volumetric dosage pump 91, arranged for filling up containers, comprises a body 93 with a piston 94 slidingly mounted therein. A switching valve or channel 95 is arranged in the piston 94. The switching valve works in rotation around an axis AA' to alternatingly connect the inlet 96 and the outlet 97 to the metering chamber of the pump. The piston and switching means is therefore a single element extending outside the body 93.

A driving machine 92 comprises a static body 98 and an arm 99 for driving a sliding movement along a machine axis (BB') and a rotational movement around the machine axis (BB').

The piston and switching means 94 is fastened to the arm 99 and the body 93 of the pump 91 is fastened to the static body 98 by shape cooperation exclusively. The fastening of the body is here represented as a spigot 101 arranged to be fixed to the static portion 98 of the machine 92.

This representation is however only schematic and illustrative. Any other configuration of a two-element pump is possible.

The hooking means and clips described above can be use in this configuration with a two-element pump, just as of the three-element pump described in details above.

Regarding the method of the invention, for setting up in an operating position the volumetric dosage pump 91 one holds, the piston means and the switching means fast together with the body (3) of the pump (1),
one hooks up either one of the body (3; 93) and the piston means (4, 94) and the switching means (5; 94) to a pivot (P), and
one rotates the pump (1) around the pivot (P) to fasten the other ones of the body, the piston means and the switching means on an operating support.

In all cases above, the pivot point has been described at an extremity of the pump. However, this pivot pump can also be more central, at any level of the pump. For example, the spigot 10 could be a hooking means to connect in the first place, while the pump would be maintained in an oblique position. The pump could then be rotated around the pivot to reach a vertical position in which the pump axis is aligned with the machine axis in order to fasten both extremities of the pump, by cooperation of shape, virtually simultaneously. Both extremities of the pump would then "click" to set up the pump in operating position.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Method for setting up in an operating position a volumetric dosage pump arranged for filling up containers, the pump comprising a body with piston means slidingly mounted therein and switching means rotatably mounted within the body, the piston means and the switching means extending outside the body, and a driving machine comprising a static body and a first arm configured to drive a sliding movement along a machine axis, said method comprising the following steps:
   holding the piston means and the switching means fast together with the body of the pump,
   hooking up one of the body, the piston means and the switching means to a pivot (P) the pivot (P) having a rotation axis perpendicular to the machine axis, and
   connecting the other of the body, the piston means and the switching means exclusively by rotating the pump in a plane around the rotation axis of the pivot (P) to achieve self-interlocking of the pump on an operating support of the driving machine.

2. Method according to claim 1, wherein the pump comprises a piston including a switching valve, slidingly and rotatably mounted within the body.

3. Method according to claim 1, wherein the piston means comprises a piston slidingly mounted within the body and a switching valve rotatably mounted within the body, the piston and the switching valve extending outside the body and wherein:
   the hooking up includes hooking up either one of the body, the piston and the switching valve to the pivot (P), and
   the rotating includes rotating the pump around the pivot (P) to fasten the two others of the body, the piston and the switching valve on the operating support.

4. Method according to claim 3, the operating support comprising a rotating part, further comprising fastening the switching valve to said rotating part.

5. Method according to claim 3, the operating support comprising a sliding part, further comprising fastening the piston to said sliding part.

6. Method according to claim 1, wherein the piston means is slidingly mounted along a pump axis and the switching means is rotatably mounted around said pump axis and, upon rotation of the pump, the pump axis moves within a vertical plane.

7. Method according to claim 1, further comprising setting up the volumetric dosage pump on a driving machine having a static body and a first arm, for driving a sliding movement of the piston means, said arm having a machine axis.

8. Method according to claim 7, wherein at the end of the rotation, the pump axis overlaps the machine axis.

9. Method according to claim 1, further comprising the preliminary step of
   grabbing the piston means and the switching means assembled together within the body of the pump with a handle.

10. An assembly, comprising: a volumetric dosage pump arranged for filling up containers and comprising a body with a piston slidingly and rotatably mounted within the body, the piston extending outside the body, and—a driving machine comprising a static body and a first arm configured to drive a sliding movement along a machine axis, wherein the piston and the body of the pump are arranged to be fastened to the first arm and the static body respectively, by hooking up the piston or the body to a pivot (P), the pivot (P) having a rotation axis perpendicular to the machine axis, and connecting the other of the body or piston exclusively by rotating the pump in a plane around the rotation axis of the pivot (P) to achieve self-interlocking of the pump on an operating support of the driving machine, wherein the piston comprises a piston and a switching valve and wherein the first arm is also configured to drive a rotational movement of the piston with the switching valve around the machine axis.

11. The assembly according to claim 10, wherein the piston and the volumetric dosage pump comprises a switching valve, each of the piston and the switching valve extending outside the body and wherein the driving machine further comprises a second arm configured to drive a rotational movement of the switching valve around the machine axis, the switching valve being arranged to be fastened to the second arm.

12. The assembly according to claim 10, wherein the piston is slidingly and rotatably mounted along a pump axis and, in an operating position, the pump axis is aligned with the machine axis.

13. The assembly according to claim 10, wherein the self-interlocking is achieved by means arranged respectively on the piston means and the first arm, on the body of the pump and on the static body of the machine.

14. The assembly according to claim 13, wherein the self-interlocking means are at least partially made of thermoplastic.

15. The assembly according to claim 11, wherein the self-interlocking is achieved by means arranged respectively on the piston and the first arm, on the body of the pump and on the static body of the machine, and on the switching valve and the second arm.

16. An assembly, comprising: —a volumetric dosage pump arranged for filling up containers and comprising a body with a piston slidingly mounted within the body and a switching valve rotatably mounted within the body, the piston extending outside the body, and the switching valve extending outside the opposite side of the body, and—a driving element comprising a static body and a first arm configured to drive a sliding movement of the piston along a machine axis, and a second arm configured to drive a rotating movement of the switching valve around the machine axis wherein the piston, the switching valve and the body of the pump are arranged to be fastened to the first arm, the second arm and the static body respectively, by hooking up the piston, the switching valve or the body to a pivot (P), the pivot (P) having a rotation axis perpendicular to the machine axis, and connecting the other of the body, the switching valve or the piston exclusively by rotating the pump in a plane around the rotation axis of the pivot (P) to achieve self-interlocking of the pump on an operating support of the driving machine.

* * * * *